(12) United States Patent
Cooper

(10) Patent No.: US 8,332,990 B2
(45) Date of Patent: Dec. 18, 2012

(54) WINDSHIELD WIPER BLADE AND SUITED FOR REMOVAL OF SOLID MATERIAL

(76) Inventor: Jeffrey Cooper, New Holland, IL (US)

( * ) Notice: Subject to any disclaimer, the term of this patent is extended or adjusted under 35 U.S.C. 154(b) by 0 days.

(21) Appl. No.: 13/493,082

(22) Filed: Jun. 11, 2012

(65) Prior Publication Data

US 2012/0291217 A1 Nov. 22, 2012

Related U.S. Application Data

(63) Continuation-in-part of application No. 13/112,417, filed on May 20, 2011, now abandoned.

(51) Int. Cl.
*B60S 1/38* (2006.01)
(52) U.S. Cl. .................... 15/250.41; 15/250.43
(58) Field of Classification Search .............. 15/250.4, 15/250.41, 250.361, 250.48, 250.43, 250.44, 15/250.451
See application file for complete search history.

(56) References Cited

U.S. PATENT DOCUMENTS

| | | | |
|---|---|---|---|
| 3,138,816 A * | 6/1964 | Abodeely | 15/250.41 |
| 4,339,839 A * | 7/1982 | Knights | 15/250.04 |
| 4,649,593 A | 3/1987 | Gilliam, III | |
| 5,235,720 A | 8/1993 | Kinder | |
| 5,301,384 A | 4/1994 | Perry | |
| 5,327,615 A | 7/1994 | Green | |
| 5,406,672 A | 4/1995 | Hipke | |
| 5,634,841 A | 6/1997 | Gold | |
| 5,778,483 A * | 7/1998 | Dawson | 15/250.04 |
| 6,505,378 B1 | 1/2003 | Squires | |
| 6,622,337 B2 | 9/2003 | Hsieh | |
| 6,748,621 B1 | 6/2004 | Root | |
| 7,707,681 B1 | 5/2010 | Cabak | |
| 2006/0191094 A1 | 8/2006 | Dace-Smith | |
| 2007/0186366 A1 * | 8/2007 | Alley | 15/250.4 |

* cited by examiner

*Primary Examiner* — Gary Graham
(74) *Attorney, Agent, or Firm* — Global Intellectual Property Agency, LLC

(57) ABSTRACT

A wiper blade device with a durable mesh sponge member attached between two removable wiper blade members. The combination sponge and wiper blade construction provides a unitary device that combines the two distinct functions of cleaning solids and wiping water from vehicular windshields. The device further provides minimal windshield obstruction given its construction, improving current wiper blade capabilities without degrading visibility or impacting safety of the vehicle. The device may comprise a wiper blade refill attachable to a wiper blade mount, providing the practitioner with an improved windshield wiper blade that is cost effective and one that requires no modification of the vehicle to implement.

10 Claims, 3 Drawing Sheets

WINDSHIELD WIPER BLADE AND SUITED FOR REMOVAL OF SOLID MATERIAL

CROSS REFERENCE TO RELATED APPLICATION

This application claims the benefit of U.S. patent application Ser. No. 13/112,417 filed on May 20, 2011 and entitled "Windshield Wiper Blade Refill Suited for Removal of Solid Material." The patent application identified above, application Ser. No. 13/123,417 filed on May 20, 2012 is incorporated here by reference in its entirety to provide continuity of disclosure.

BACKGROUND OF THE INVENTION

1. Field of the Invention

The present invention relates to a device for performing the two distinct functions of cleaning solids and wiping water from vehicular windshields. It is generally well known in the field that windshield wipers are effective for removing water, but they are relatively ineffective for removing solids such as solid insect remains and bird droppings without creating extensive and potentially dangerous smears. The smears are caused by the rubber squeegee action of the blades, which tends to smear solids into a thin film by forcing it against the glass surface rather than scooping it or brushing it away. Consequently, the driving practitioner may be forced to halt their vehicle to scrub off solid matter manually or risk further driving with obscured vision through the windshield.

In certain geographic locations and climates, it is common for airborne bugs and insects to collide with, and become compressed against, the windshield of a vehicle. The accumulation of such bugs, insects and other debris on the windshield is greatest when the vehicle is in operation, but significant accumulation can also occur when the vehicle is stationary for a long period. This is particularly true of bird droppings and cars parked in wooded areas for periods of time. Removal of bugs, insects and other debris attached to the windshield is imperative to ensure safe operation of the vehicle as accumulation can significantly impair the driver's vision and line of sight.

The most effective means of removing the accumulated bugs, insects and other debris is to hand wipe the windshield with a towel combined with a solvent or cleaner. However, this form of cleaning is not always possible or feasible during the operation of a moving vehicle. In such instances, the driver must rely on using windshield wipers, which are designed to remove accumulation of water rather than solid debris. Wiper blades are constructed of rubber or a similarly flexible material in order to conform to the sloped surface of the windshield for effective removal of water or other liquids. However, wiper blades are generally ineffective for removing or dislodging these solid materials, particularly those that are stuck, bonded, or otherwise attached to the exterior surface of a windshield and are not easily ushered away by the wiper's sweeping action. There exists a need for a device capable of removing bugs, insects and other debris from the windshield of a car without user intervention. Further, such a device should be easily removable and replaceable, and require no modification to the standard vehicle wiper blades or wiper mounts.

2. Description of the Prior Art

Numerous designs for windshield wipers have been provided in the prior art. Even though these designs may be suitable for the specific individual purposes to which they address, these prior art devices have several known drawbacks. Specifically, such devices do not include or suggest a wiper blade system has removable and replaceable parts that both wipe and clean a windshield surface.

Several prior art patents address the issue of adding a scrubbing sponge portion in parallel with traditional blades. However, these devices have blades that are either fixed in place or restricted from movement. This lack of blade movement can result in damage to a user's windshield when blades drag along its surface. Gilliam, III U.S. Pat. No. 4,649,593 is directed to a combined windshield wiping and cleaning device having a scrubbing member with a reticular surface for removing solid matter along with a wiper member with squeegee for removal of water. These are attached together with a supporting base as a single monolithic extrusion of an elastomeric material. The Gilliam invention fits into the windshield wiper arm in the same way as current blades.

Similarly, Kinder U.S. Pat. No. 5,235,720 is directed to a windshield scrubbing and wiping blade assembly including a scrubbing blade, having a mesh covered scrubbing portion, and at least one wiping blade in parallel, spaced apart in relationship with the scrubbing blade. The mesh and the associated scrubbing portion of the scrubbing blade define side channels for receiving and transporting debris removed by the mesh from the windshield. In the two bladed embodiment of the invention, the scrubbing blade is shorter than the wiping blade and is maintained out of contact with the windshield during the portion of the wiping cycle in which the scrubbing blade trails the wiping blade. Hipke U.S. Pat. No. 5,406,672 is directed to a windshield wiper blade system comprising an elastomeric wiper blade, an elongated base portion, a coupling mechanism for coupling the base portion; a squeegee coupled to the base portion and extended downwards therefrom to contact the surface of a windshield; and a scrubbing blade. The scrubbing blade further comprises a sponge extended along and coupled to the base portion near the squeegee with the sponge having a surface adapted to conform with the surface of a windshield; and webbing disposed about the sponge and defining a scrubbing surface. Thus, when the system swipes back and forth across the surface of the windshield the wiper blade and the scrubbing blade remove both water and bugs.

Additionally, Hsieh U.S. Pat. No. 6,622,337 is directed to a wiper blade for a car comprising a seat part, a moisture absorptive part, and a sweep part. The seat part is an elongated strip made of non-absorptive material. The moisture absorptive part is made of water absorbable material and has a length and a width thereof corresponding to the seat part for joining with the seat part. The sweep part is an elongated strip with a gap and has a size corresponding to the absorptive part for joining with the absorptive part. The moisture absorptive part can keep the sprayed water for next wipe as soon as the sweep part removes the foreign substances on a windshield of the car. Root U.S. Pat. No. 6,748,621 is directed to a vehicle windshield wiper assembly for providing a user with a set of windshield wipers for motor vehicles designed to scrub insects off the glass. The blade member is for providing support to a plurality of cleaning members and a cleaning blade. The cleaning members and the cleaning blade are for facilitating cleaning of debris the windshield of a vehicle. Green, U.S. Pat. No. 6,5327,615 discloses a wiper blade assembly having two wiper blade portions running parallel to a cleaning member disposed therebetween. The cleaning member is comprised of a number of rubber strips having conical ends.

The Gilliam, Kinder, Hipke, Hsieh, Root and Green inventions all describe wiper blade assemblies having fixed blades or blades whose movement is practically impaired due to the structure of the device. These replacement wipers include both one or more standard blade members and one or more sponge members, but they do not allow for the blade position to change during use of the device. As such, they may damage a practitioner's windshield during use because they are incapable of adjusting to accommodate irregularities in the windshield or large debris on the windshield surface. The present invention provides blade portions that have a self-adjusting position within two channels along the device. Thus, there is improved windshield cleaning with a reduced risk of damage to the user's windshield.

Perry U.S. Pat. No. 5,301,384 is directed to a vehicular window cleaning apparatus having a wiper arm, wiper blade and drive means in combination with a scrubber for intensifying the cleaning effort of the wiper blade. The scrubber is detachably connected to the wiper blade. An adjustment means is provided for rotating the wiper blade relative to the wiper arm sequentially positioning the wiper blade and scrubber against an associated windshield. The Perry invention requires the installation of a non-standard articulator control for the sponge portion, requiring a costly deviation from traditional wipers.

Gold U.S. Pat. No. 5,634,841 is directed to an apparatus for removing scratches and/or stains from a vehicle windshield includes a cylindrical sponge having a radial opening which fits snugly over a windshield wiper blade with the windshield wiper arm connected to the blade through the radial opening in the cylindrical sponge. The methods of the invention include moistening the cylindrical sponge and applying a polishing abrasive. Activating the vehicle windshield wiper wipes the abrasive on the windshield with the sponge. Other methods of the invention include impregnating the sponge with a polishing abrasive or moistening the sponge with windshield washer fluid. The device described in Gold is not a windshield wiper in the traditional sense; rather the Gold invention describes a device and means of repairing and improving windshields, and is thus not analogous to the present invention.

Other devices described in the prior art simply add a sponge component to current wiper blades. Squires U.S. Pat. No. 6,505,378 is directed toward a wiper assembly for providing additional scrubbing surface area. The wiper assembly includes a wiper blade designed for coupling to a wiper arm of a vehicle; a scrubbing member, which couples to the wiper blade for removing debris from the windshield; and a plurality of clip members for coupling the scrubbing member to the wiper blade. Similarly, Cabak U.S. Pat. No. 7,707,681 is directed to a windshield wiper clip adapted for connecting a scrubbing blade to a windshield wiper, wherein the clip connects a scrubber to a wiper in order to accommodate bug removal during movement of the wiper about a windshield. The invention also includes an integrated clip and scrubber, as well as wiper-scrubber system. A novel scrubber mount having rounded shoulders is also described. By simply adding a sponge component to current wiper blades, the Squires and Cabak inventions do not describe a complete system of blades and sponges. Further, the Squires and Cabak inventions greatly increase the size of the wiper assembly, risking obscured vision during vehicle operation.

The present invention differs from the prior art in that it offers an easily removable and wiper device with removable wiper blade portions. These wiper blade portions have a range of motion that allows them to adjust to large debris on the windshield surface, reducing the risk of damage to a user's windshield. Additionally, the present invention does not require costly non-standard mounts or modifications to the standard wiper assembly. Further, having two blade members allows for optimal cleaning of debris, such that smears are unlikely whether the wiper is moving up or down on the windshield. The present invention will greatly assist vehicle users in preventing bugs and other debris from remaining lodged upon the windshield. Practitioners will be capable of easily cleaning the windshield during vehicle operation without any significant modification to their wiper blade assemblies. Further, users will find the present invention easy to install and replace when needed.

SUMMARY OF THE INVENTION

In view of the foregoing disadvantages inherent in the known types of wiper blades now present in the prior art, the present invention provides a new wiper blade and sponge device wherein the same can be utilized for providing convenience for the user when removing bugs or other sticky debris from their windshield while operating a motor vehicle.

The present invention is a removable replaceable windshield wiper refill system that utilizes a netted sponge for cleaning debris instantly from the windshield in conjunction with two wiper blade members for water removal. The inner sponge is comprised of a netted mesh, mounted between two blades and inset slightly for optimum efficiency. The present invention allows the practitioner to clean debris anytime and anywhere from the windshield while operating their motor vehicle. The present invention is designed such that a squirt of wiper fluid will wet the sponge, allowing the most dried on and persistent smears to be efficiently cleaned from the windshield. The present invention is composed of one solid unit that can be removed and replaced easily and inexpensively manufactured. Further, the present invention is made in all typical windshield wiper lengths and will fit any of the current windshield wiper mounts.

The present invention will comprise of a base component made of hard plastic, rubber or metal that is shaped for use as a blade refill, capable of attachment to a windshield wiper frame or wiper mount. The present invention further has two wiper blade components made of durable rubber or silicone, positioned to abut with the windshield outer surface. Attached between the two blades is a sponge component made of dense sponge material wrapped in durable nylon mesh netting for grabbing debris. The present invention is distinguished from prior art in that: it will clean, scrub, and remove debris quickly; has the simplicity of only being one assembled device to be easily changed; and is designed to fit any current standard wiper blade rail or wiper blade mount.

The primary object of the present invention is to utilize the mesh netted sponge between two wiper blades to quickly remove debris such as mud, sap or bug remains when crossing the windshield with a minimal number of passes. Minimizing the number of swipes ensures the vehicle operator will not encounter a loss of visibility.

A secondary object of the present invention is to provide a wiper device that will clip or slide onto any type of wiper blade or alternatively, attach to any type of wiper blade arm mount. The present invention has a mesh netted sponge positioned in between double rubber or silicon blade member to better clean debris from the windshield. The netted sponge runs the entire length of the blades and is slightly inset to prevent overlap with the blades during operation.

It is a further object of the invention to provide at least one scrubbing member comprising a net covered sponge member arranged in parallel with to two elongated rubber or silicon wiper members of generally conventional design. Both the wiper function and the scrubbing function are supported by a common base along the entire length of each member, wherein the base is adapted to be held in place and operated by a windshield wiper blade arm mount or wiper blade assembly which may be of conventional design.

Other objects, features and advantages of the present invention will become apparent from the following detailed description taken in conjunction with the accompanying drawings.

BRIEF DESCRIPTIONS OF THE DRAWINGS

DETAILED DESCRIPTION OF THE INVENTION

Figure 1:
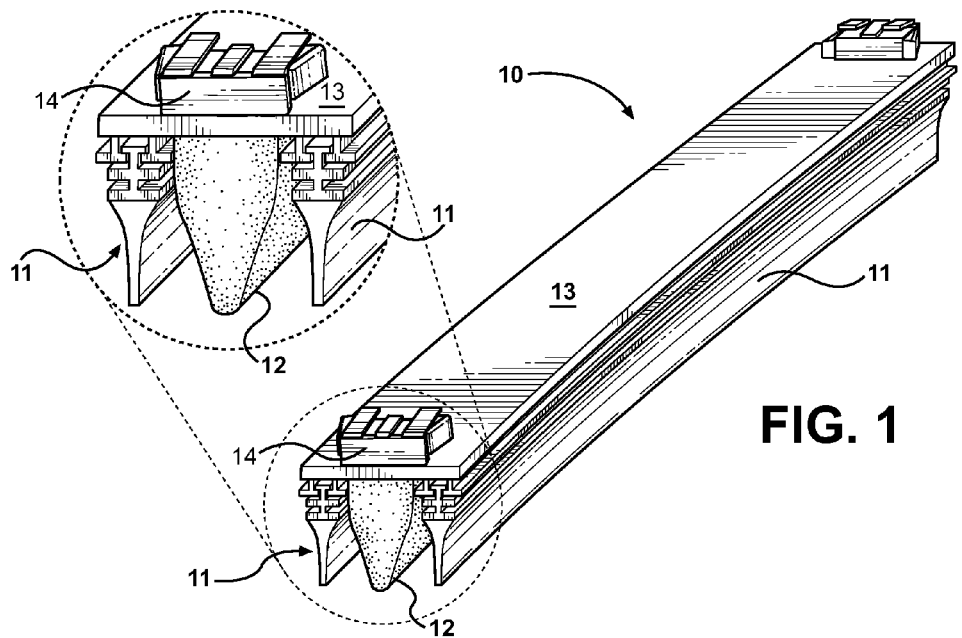
FIG. 1 is a perspective view of the present invention, with a close-up perspective view of the terminal end of the blades and scrubbing member.

Reference is made herein to the attached drawings. Like reference numerals are used throughout the drawings to depict like or similar elements of the windshield wiper blade device. For the purposes of presenting a brief and clear description of the present invention, the preferred embodiment will be discussed as used for cleaning and wiping the surface of an automobile windshield. The figures are intended for representative purposes only and should not be considered to be limiting in any respect.

Referring now to FIG. 1, there is shown a perspective view of the present invention, with a close-up perspective view of the terminal end of the blades 11 and the internal scrubbing member 12. The present invention 10 consists of a pair of rubber or silicone wiper blade members 11 removably attached on either side of a mesh netting sponge member 12 to a base component 13. The base component 13 may be made of metal, rubber or any other suitable material, an. A connection bracket 14 is disposed along each end of the base to provide removably securable engagement between the device and a wiper blade mount. The close-up view demonstrates the terminal end of the device 10, showing the base component 13 with the connection bracket 14, as well as the mesh net sponge 12 attached in between the wiper blade members 11.

Figure 2:
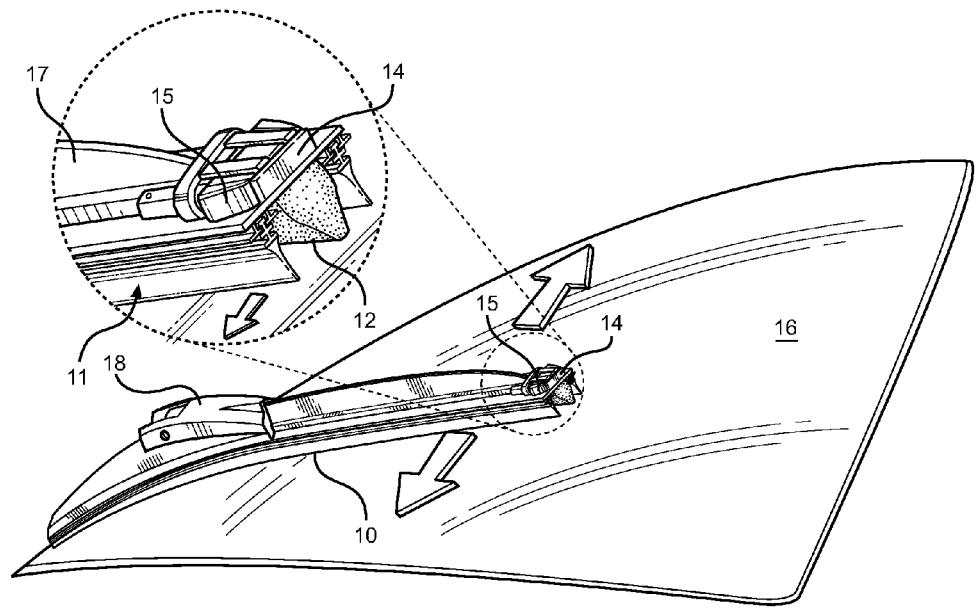
FIG. 2 is a perspective view of the present invention in use, attached to a windshield wiper arm assembly, with a close-up perspective view of the attached ends.

Referring now to FIG. 2, there is shown a perspective view of the present invention in use, attached to a standard wiper blade assembly, with a close-up perspective view of the end connection bracket 14 for attachment. The present invention 10 is attached over a traditional wiper blade 17 or to a wiper blade mount 18 using the mount connection bracket 14 on the base component 13. In a preferred embodiment depressible release buttons 15 are disposed on the connection bracket 14 and must be depressed to release the engagement of the bracket to the wiper blade 17 or wiper blade mount 18. Thus, the release buttons 15 prevent inadvertent removal of the device while it is in use. FIG. 2 illustrates the device 10 in use on a typical vehicle windshield 16. The close up demonstrates the terminal end of the device when attached to a standard windshield wiper 17, and shows the mesh net sponge 12 in between the two blade members 11, with the connection bracket 14 to secure the device.

Figure 3:
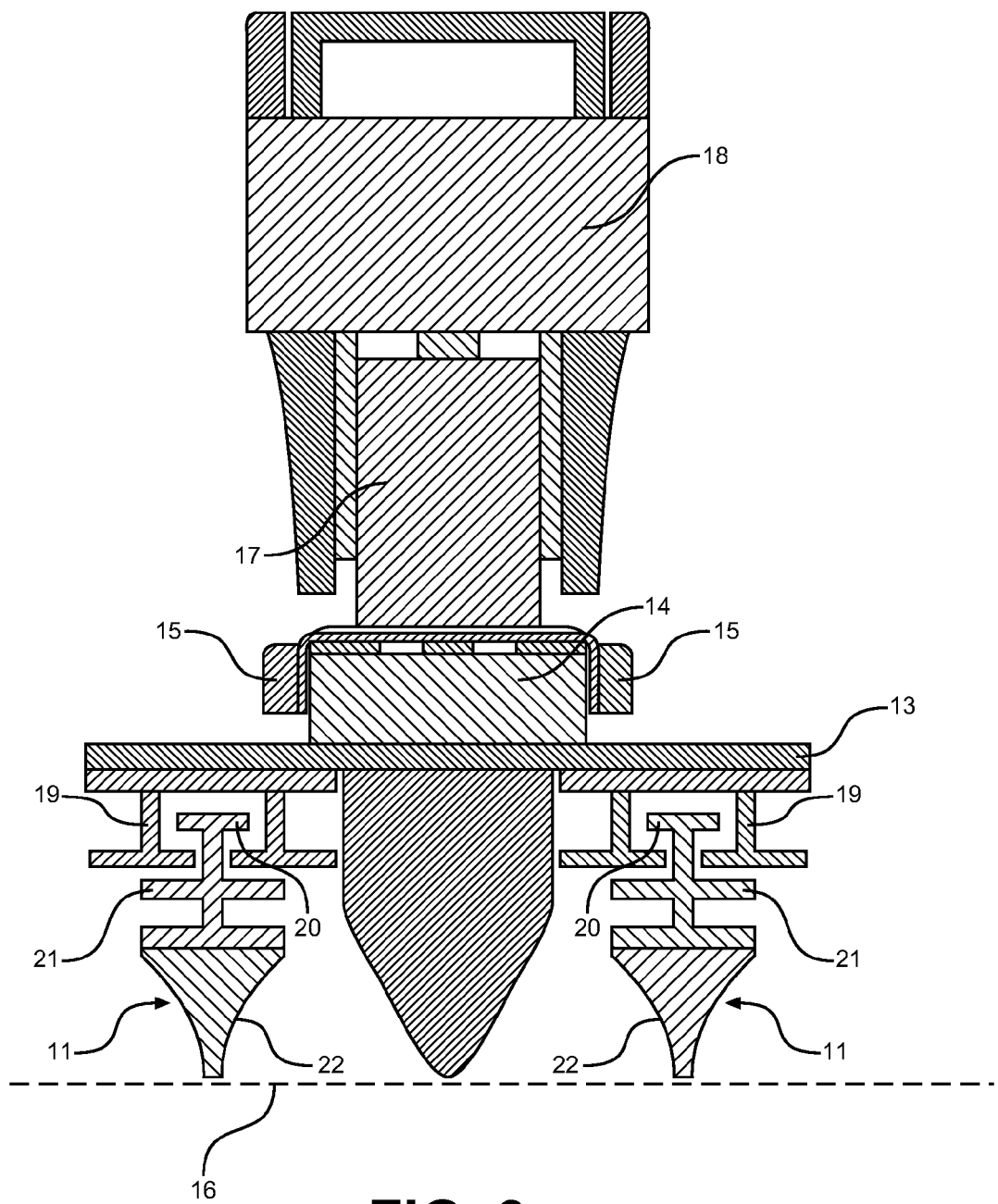
FIG. 3 shows a cross-section view of the wiper device attached to a windshield wiper arm assembly.

Turning now to FIG. 3, a cross-sectional view of the device is shown, disclosing the structure of the overall device and the engagement of its subparts. Two hollow tunnels 19 run parallel along the length of laterally opposing sides of the base 13. Each tunnel has two sidewalls an upper wall and a lower wall, which define an empty space therebetween. The upper wall of each tunnel is affixed to the underside of the base. Each lower tunnel wall is separated into two halves with a space between the halves, forming a channel that extends the entire length of the tunnel. Wiper blade members 11 are removably retained within the channels. A wiper blade member comprises a blade 22 and a retaining portion 20. In a preferred embodiment the wiper blade member also includes a restraining bar 21 that prevents the scrubbing member 12 from interfering with the wiper blade members during operation of the device. A narrow area connecting the retaining portion to the restraining bar is adapted to fit within the channel of a lower tunnel wall. The retaining portion is larger in width than the channel but is adapted to fit loosely within the tunnel. Thus the wiper blade member is removably retained within the tunnel by slidably engaging the narrow portion of the wiper blade member into the lower tunnel wall channel so that the blade member's retaining portion is housed within the tunnel.

The device is removably affixed to an automobile via a connection means 15 that engages with a wiper blade 17 or wiper blade mount 18. This keeps the windshield-cleaning device in place and in contract with the windshield during use. If a user wants to replace the device, he or she can depress the buttons 14 on either side of the connection bracket to release the engagement. In this way, the device is easily installed and replaced as necessary.

Figure 4:
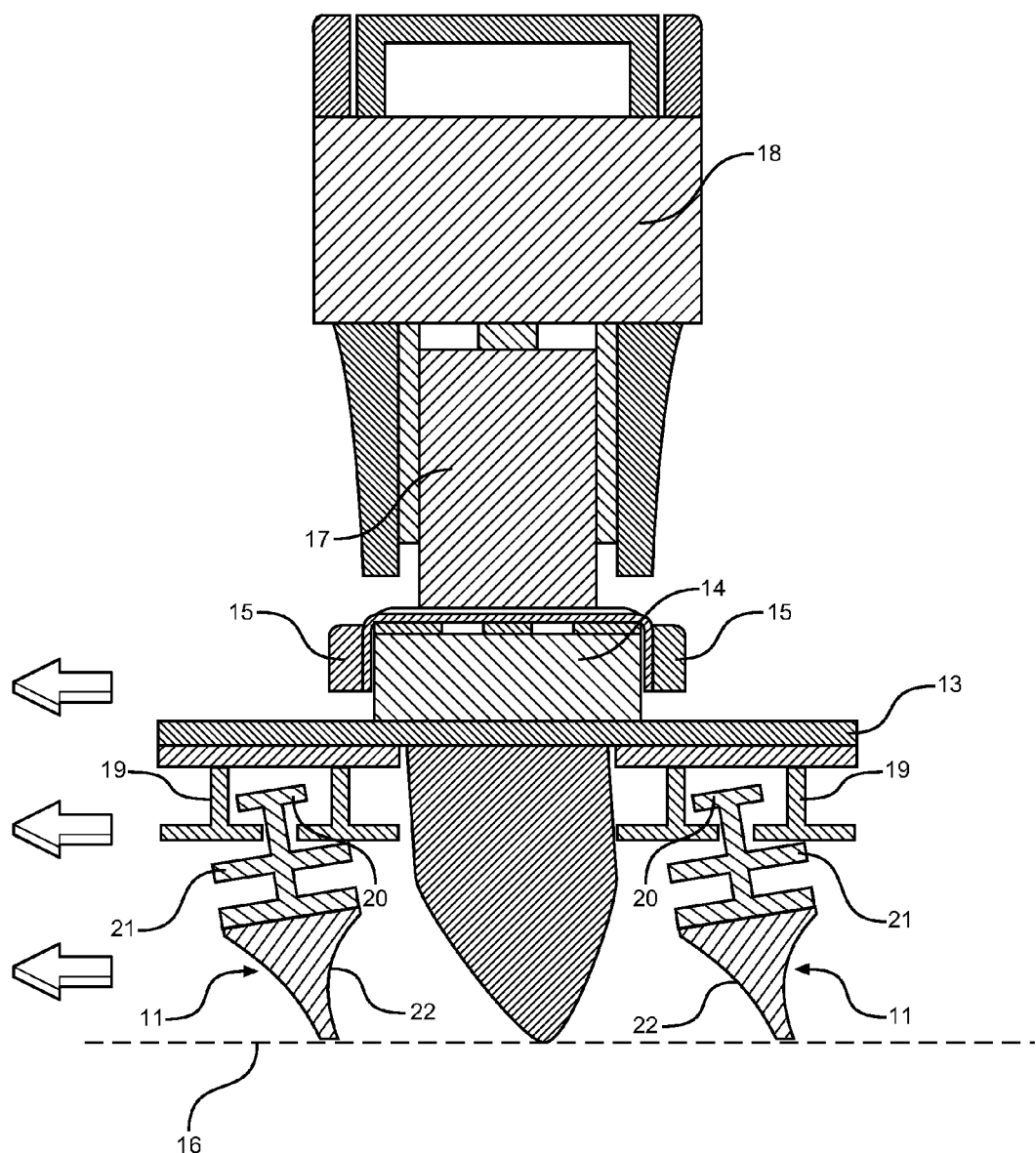
FIG. 4 shows a cross-section view of the wiper device attached to a windshield wiper arm assembly and in use for cleaning the surface of an automobile windshield.

In FIG. 4 the device is shown in use for cleaning the surface of a windshield 16. As the device is moved across the user's windshield the first of the blades 22 of the wiper blade members 11 pushes debris off the surface, much like a plow. The scrubbing member 12 then moistens and scrubs the surface. A second wiper blade member follows behind the scrubbing member, pushing accumulated moisture and any loosened debris off the windshield surface.

Unlike many conventional wiper blade members, the blade members 11 of the present invention are not fixed to the base of the device, nor are the blade members snuggly retained within the tunnels 19 rendering them practically immobile. The shape of the present wiper blade members allows the retaining portion 20 to shift within the tunnel to adjust to objects on the windshield surface. Immobile wiper blades scrape debris off a windshield but can cause damage to the windshield if the debris has adhered to the windshield surface. The present shifting wiper blade members will push debris off the surface but will adjust to firmly stuck debris, passing over it so that the scrubbing member can loosen the debris for removal by the second scrubbing member. Thus the mobility of the present wiper blade members reduces the potential for damage to the windshield that could result from forcing caked on debris off of the windshield. Further, the shape of the wiper blade members facilitates easy removal and replacement of blade members that become damaged during use. In a fixed blade member device, the entire device must be replaced if any part is damaged. Conversely, the present invention is structurally designed to permit replacement of the wiper blade members without necessitating the replacement of the entire device.

The scrubbing member also has a specialized shape. The wedge shaped tip ensures that as much of the windshield surface as possible is cleaned with each pass of the device. Many devices have round sponges, resulting in a small surface area cleaned on each pass of the sponge. The present invention has a scrubbing member with generally flat surfaces on each side so that when the device passes over a windshield most of the surface area of the applicable side of the scrubbing member tip is in contact with the windshield surface. This maximizes the effectiveness of the scrubbing member and increases the overall cleanliness of the automobile windshield.

In use an individual attaches the device 10 to a standard windshield wiper 17 or wiper mount arm 18, using the connection bracket 14. When the vehicle wiper mechanism activates, the device 10, will swipe across the surface of the windshield 16. In use, the device will first pass over the bugs or debris with a blade member 11, then scrub the bugs or debris with the sponge 12, then again with a second blade member 11 in a single pass. Ideally, practitioners will moisten the mesh net sponge portion 12 of the device 10 with windshield wiper fluid. The mesh net sponge 12 is slightly shorter than the two wiper blade members 11, thus ensuring that no overlap will occur during usage. When activated the blade will swipe across the windshield 16, the blade members 11 and sponge 12 will deflect slightly without overlap to conform to the shape of the windshield 16.

The practical design of the device 10, allows for easy removal and replacement when one or more portions have worn. Replacement will simply involve depressing the release buttons 15 and disengaging the worn device 10 from the wiper blade 17 or mount 18, then locking a new device into the connection brackets. The blade members 11 may be made of rubber, silicon or any other appropriate material. The sponge 12 may be covered with a mesh netting of nylon or any other material, such that it is highly durable and capable of scrubbing without scratching the windshield. The sponge 12 will also be slightly shorter than the two blade members 11, with gaps on either side to prevent overlap during the swiping process and to better clean away bugs and other debris from the windshield.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A combination windshield cleaning and wiping device comprising:
    an elongated base component having an upper and lower surface;
    two tunnels running in parallel along laterally opposing sides of said base component, wherein each of said tunnels has an upper wall, two sidewalls, and a lower wall, said upper wall being affixed to said lower surface of said base component, and each of said tunnel lower walls is divided into two halves by a channel extending the entire length of said tunnel;
    two blade members, each has a blade connected by a connecting portion to a retaining portion, and wherein said connecting portion has a width less than that of said channel in said tunnel lower wall;
    said blade members are removably secured to said base component by slidable engagement between said channels and said connecting portions, wherein said retaining portions are housed loosely within said tunnels when said blade members are secured to said base component;
    a mesh net covered sponge secured to said lower surface of said base component between and slightly shorter than said blade members.

2. The device of claim 1, wherein said blade members and said sponge do not overlap during usage.

3. The device of claim 1, further comprising:
    a connection bracket secured to said upper surface of said base component, wherein said connection bracket lockably engages with an automobile wiper blade or wiper blade mount.

4. The device of claim 3, wherein said connection bracket has depressible buttons disposed on laterally opposing sides of said connection bracket for releasing engagement with said wiper blade or wiper blade mount.

5. The device of claim 1, wherein said sponge has a wedge shaped tip having two flat sides.

6. The device of claim 1, wherein said blade members further comprise retaining bars positioned between said retaining portions and said blades.

7. A combination windshield cleaning and wiping device comprising:
    an elongated base component having an upper and lower surface;
    two tunnels running in parallel along laterally opposing sides of said base component, wherein each of said tunnels has an upper wall, two sidewalls, and a lower wall, said upper wall being affixed to said lower surface of said base component, and each of said tunnel lower walls is divided into two halves by a channel extending the entire length of said tunnel;
    two blade members, each has a blade connected by a connecting portion to a retaining portion, and wherein said connecting portion has a width less than that of said channel in said tunnel lower wall;
    said blade members are removably secured to said base component by slidable engagement between said channels and said connecting portions, wherein said retaining portions are housed loosely within said tunnels when said blade members are secured to said base component;
    a mesh net covered sponge secured to said lower surface of said base component between and slightly shorter than said blade members;
    a connection bracket secured to said upper surface of said base component, wherein said connection bracket lockably engages with an automobile wiper blade or wiper blade mount.

8. The device of claim 7, wherein said connection bracket has depressible buttons disposed on laterally opposing sides of said connection bracket for releasing engagement with said wiper blade or wiper blade mount.

9. The device of claim 7, wherein said sponge has a wedge shaped tip having two flat sides.

10. The device of claim 7, wherein said blade members further comprise retaining bars positioned between said retaining portions and said blades.

* * * * *